United States Patent
Pratlong et al.

(10) Patent No.: US 7,688,001 B2
(45) Date of Patent: Mar. 30, 2010

(54) METHOD AND SYSTEM FOR PROVIDING A CHARGE PUMP FOR LOW VOLTAGE APPLICATIONS

(75) Inventors: Jerome Pratlong, Aix-en-Provence (FR); Marc Merandat, Bouc Bel Air (FR); Stephane Ricard, Bouc Bel Air (FR); Sylvie Bruneau Vergnes, Trets (FR); Laureline Bour, Pourrieres (FR)

(73) Assignee: Atmel Corporation, San Jose, CA (US)

( * ) Notice: Subject to any disclaimer, the term of this patent is extended or adjusted under 35 U.S.C. 154(b) by 926 days.

(21) Appl. No.: 11/440,501

(22) Filed: May 24, 2006

(65) Prior Publication Data

US 2007/0247081 A1    Oct. 25, 2007

(30) Foreign Application Priority Data

Apr. 19, 2006    (FR) .................................. 06 03448

(51) Int. Cl.
*H05B 37/00* (2006.01)
*H03L 7/00* (2006.01)
*H03L 7/06* (2006.01)

(52) U.S. Cl. .................. 315/241 R; 331/10; 327/157
(58) Field of Classification Search .................. 331/10, 331/11, 14, 18; 327/156, 157, 158; 315/291, 315/307

See application file for complete search history.

(56) References Cited

U.S. PATENT DOCUMENTS

| 4,492,935 A | 1/1985 | Fleischer et al. |
| 5,280,420 A | 1/1994 | Rapp |
| 5,394,372 A | 2/1995 | Tanaka et al. |
| 5,532,653 A | 7/1996 | Adkins |
| 5,694,308 A | 12/1997 | Cave |
| 5,834,950 A * | 11/1998 | Co et al. ....................... 327/12 |
| 5,940,284 A | 8/1999 | Troutman |
| 6,026,002 A | 2/2000 | Viehmann |
| 6,064,251 A | 5/2000 | Park |
| 6,064,275 A | 5/2000 | Yamauchi |
| 6,160,440 A | 12/2000 | Javanifard et al. |

(Continued)

FOREIGN PATENT DOCUMENTS

DE    19612443    10/1997

(Continued)

OTHER PUBLICATIONS

"French Application Serial No. 0603448, Search Report mailed Nov. 30, 2006", 6 pgs.

(Continued)

*Primary Examiner*—Douglas W Owens
*Assistant Examiner*—Minh D A
(74) *Attorney, Agent, or Firm*—Schwegman, Lundberg & Woessner, P.A.

(57) ABSTRACT

A method and system for providing an output voltage greater than a voltage provided by a voltage supply in a semiconductor device are disclosed. The method and system include providing at least one oscillator and at least one voltage storage/discharge stage coupled with the at least one oscillator. The oscillator has a frequency that increases as the voltage decreases. The frequency of the oscillator determines a discharge frequency for the at least one voltage storage/discharge stage.

16 Claims, 4 Drawing Sheets

U.S. PATENT DOCUMENTS

| | | | |
|---|---|---|---|
| 6,278,332 | B1 | 8/2001 | Nelson et al. |
| 6,356,469 | B1 | 3/2002 | Roohparvar et al. |
| 6,385,065 | B1 | 5/2002 | Roohparvar et al. |
| 6,531,913 | B1 | 3/2003 | Ross |
| 6,801,076 | B1 | 10/2004 | Merritt |
| 6,873,214 | B2 * | 3/2005 | Harwood .................... 331/17 |
| 6,909,331 | B2 * | 6/2005 | Ballantyne .................. 331/10 |
| 7,002,416 | B2 * | 2/2006 | Pettersen et al. ............. 331/16 |
| 7,019,572 | B2 * | 3/2006 | Miki et al. ................. 327/157 |
| 7,109,764 | B2 * | 9/2006 | Sakamoto et al. ........... 327/156 |
| 7,203,149 | B1 * | 4/2007 | Sano ....................... 369/59.11 |
| 2001/0035787 | A1 | 11/2001 | Merritt et al. |
| 2002/0039301 | A1 | 4/2002 | Roohparvar et al. |
| 2002/0175723 | A1 | 11/2002 | Ruegg et al. |
| 2003/0043642 | A1 | 3/2003 | Butler |
| 2003/0174524 | A1 | 9/2003 | Botker et al. |

FOREIGN PATENT DOCUMENTS

| | | |
|---|---|---|
| EP | 0834981 A2 | 4/1998 |
| WO | WO-2007/120929 A2 | 10/2007 |

OTHER PUBLICATIONS

"International Application Serial No. PCT/US2007/009620, International Search Report mailed Aug. 21, 2008", 2 pgs.

"International Application Serial No. PCT/US2007/009620, Written Opinion mailed Aug. 21, 2008", 5 pgs.

* cited by examiner

METHOD AND SYSTEM FOR PROVIDING A CHARGE PUMP FOR LOW VOLTAGE APPLICATIONS

CROSS-REFERENCE TO RELATED APPLICATIONS

This application claims benefit under 35 USC 119 of France Application No. 06/03448, filed on Apr. 19, 2006.

FIELD OF THE INVENTION

The present invention relates to semiconductor technology and more particularly to generation of higher voltage.

BACKGROUND OF THE INVENTION

Semiconductor devices, such as EEPROMs or Flash devices, may be desired to be run using a voltage supply that provides a lower supply voltage. The lower supply voltage allows the device to consume less power and be shrunk to smaller geometries. For example, lower voltages are desired for applications such as EEPROMs used in smart cards. Although lower supply voltages are desired for the semiconductor devices, higher voltages may be desired for certain operations. For example, a voltage that is higher than the supply voltage may be required for operations such as programming memory cells. In order to obtain the higher voltages, a conventional charge pump may be used.

FIG. 1 depicts a conventional charge pump 10, which can be used to increase voltages above the supply voltage or provide a reverse polarity voltage. The conventional charge pump 10 includes a conventional capacitor-diode ladder 12 and a conventional oscillator 20 coupled with a voltage supply 22. The conventional capacitor-diode ladder 12 includes capacitor-diode pairs 13 (including capacitor 14 and diode 24), 15 (including capacitor 16 and diode 24), and 17 (that includes capacitor 18 and diode 28). The conventional oscillator 20 outputs clocks signals CLK and CLKB. The signal CLKB is the inverse of the signal CLK.

Based on the signals CLK and CLKB, the capacitor-diode pairs 13, 15, and 17 alternately charge to approximately the supply voltage and discharge. For example, the capacitor-diode pair 13 charges the capacitor 14, then discharges the capacitor 14, with a period corresponding to the frequency of the clock signal CLK. In addition, the charging and discharging between stages alternate. Thus, for example, as the capacitor 14 discharges, the next capacitor 16 charges. The charging and discharging of capacitors 14, 16, and 18 in the capacitor-diode ladder 12 allows for energy to be transferred between capacitor-diode pairs 13, 15, and 17, and output. This energy is also transferred at the output 30 of the conventional charge pump 10 by an output current provided at the output 30. Thus, a voltage above that of the conventional voltage supply 22 can be provided.

Although the conventional charge pump 10 functions, one of ordinary skill in the art will readily recognize that for lower supply voltages, the ability of the conventional charge pump 10 to provide a voltage in excess of the supply voltage while maintaining a sufficient output current may be compromised. The conventional charge pump 10 may provide a high voltage, for example on the order of fifteen or sixteen volts, even at low supply voltages. When providing such voltages using a low supply voltage, the charge pump 10 provides a lower output current from the output 30 because charge is output at a lower rate from the capacitor-diode ladder 12. Furthermore, the high voltage from by the conventional charge pump 10 may be provided to devices (not shown) such as other NMOS or PMOS devices in the semiconductor device. This high voltage may be on the order of the breakdown voltage of such devices. The leakage induced by breakdown leakage and the punch through leakage must be overcome using the output current in order for the desired operations to be performed. As the output current of the conventional charge pump 10 decreases, the effect of the leakage becomes more marked. Consequently, as the supply voltage decreases, a loss of output current from the output 30 may result. As a result, the ability of the conventional charge pump 10 to provide a sufficient output current in combination with a high voltage may be adversely affected. The conventional charge pump 10 may, therefore, be unable to provide sufficient power for operations such as programming EEPROMs in applications using lower supply voltages, such as smart cards.

Accordingly, what is needed is a method and system for providing a voltage higher than the supply voltage in lower supply voltage devices while maintaining a sufficient output current. The present invention addresses such a need.

BRIEF SUMMARY OF THE INVENTION

The present invention provides a method and system for providing an output voltage greater than a voltage provided by a voltage supply in a semiconductor device. The method and system comprise providing at least one oscillator and at least one voltage storage/discharge stage coupled with the at least one oscillator. The oscillator has a frequency that increases as the voltage decreases. The frequency of the oscillator determines a discharge frequency for the voltage storage/discharge stage.

According to the method and system disclosed herein, the present invention provides a higher voltage in low supply voltage devices, such as lower supply voltage EEPROMS and Flash devices.

DETAILED DESCRIPTION OF THE INVENTION

The present invention relates to semiconductor devices. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method and system for providing an output voltage greater than a voltage provided by a voltage supply in a semiconductor device. The method and system comprise providing at least one oscillator and at least one voltage storage/discharge stage coupled with the at least one oscillator. The oscillator has a frequency that increases as the voltage decreases. The frequency of the oscillator determines a discharge frequency for the at least one voltage storage/discharge stage.

According to the method and system disclosed herein, the present invention provides a higher voltage in low supply voltage devices, such as lower voltage EEPROMS, while maintaining a sufficient output current.

The present invention will be described in terms of a device having particular components. However, one of ordinary skill in the art will readily recognize that the method and system in accordance with the present invention may utilize other components consistent with the present invention. The present invention is also described in the context of providing a voltage higher than the supply voltage. However, one of ordinary skill in the art will readily recognize that the method and system may be used to provide reverse polarity voltages.

Figure 2:
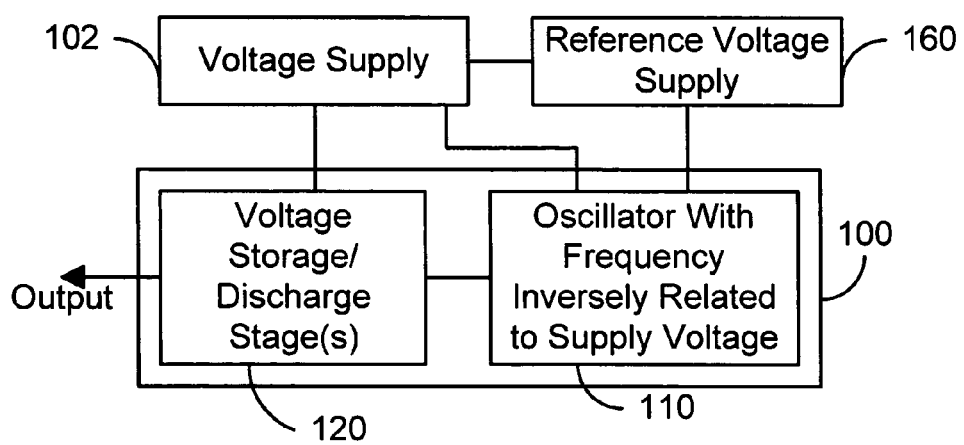
FIG. 2 is a diagram depicting one embodiment of a system in accordance with the present invention for providing a voltage higher than a supply voltage.

To more particularly describe the present invention, refer to FIG. 2, depicting one embodiment of a system 100 in accordance with the present invention for providing a voltage higher than a supply voltage. The system 100 is preferably a charge pump. The system 100 includes voltage storage/discharge stage(s) 120 and an oscillator 110, which are coupled with the voltage supply 102. The system 100 also preferably uses a reference voltage supply 160. The voltage supply 102 provides a supply voltage for the system 100. In addition, the supply voltage is preferably a lower voltage. In a preferred embodiment, the supply voltage is sufficiently low for applications such as smart cards. Thus, in one embodiment, the supply voltage is nominally 1.6 volts, but may range between 1.2 and 2 volts. However, the nominal voltage and/or voltage range of the voltage supply 102 may differ in other embodiments.

Figure 1:
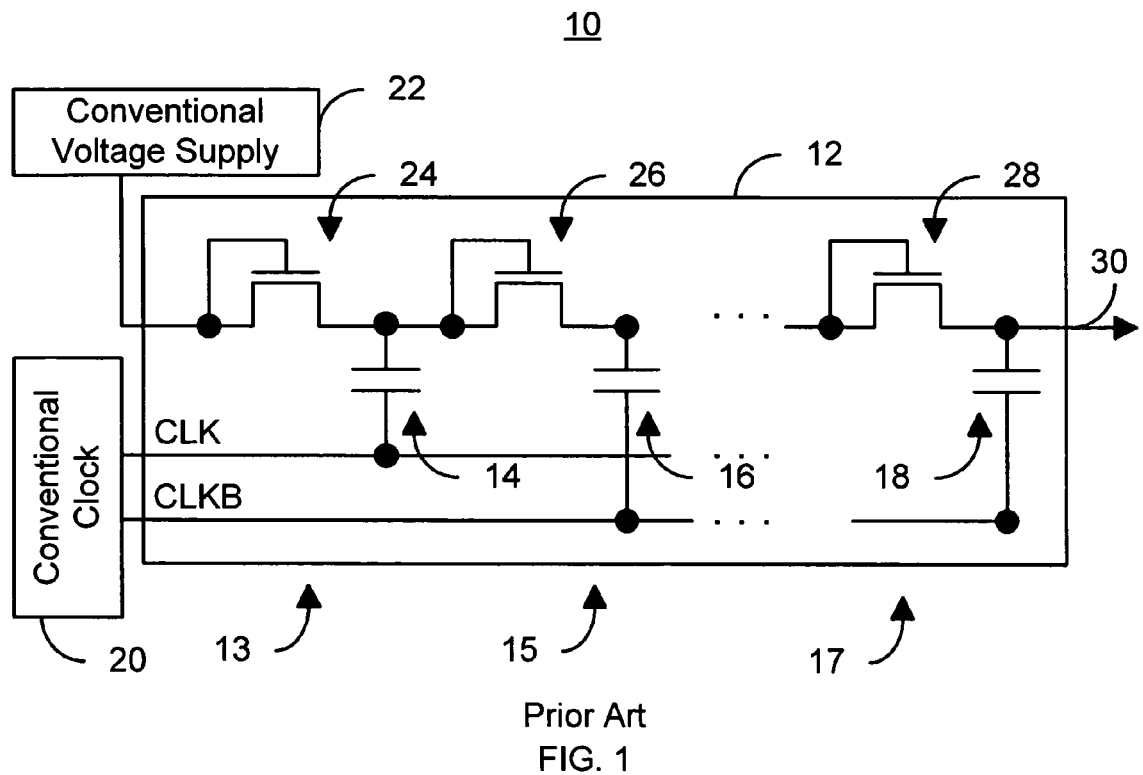
FIG. 1 is diagram depicting a conventional charge pump.

The voltage storage/discharge stage(s) 120 are capable of storing a voltage and delivering a voltage, preferably through the discharge of a voltage storage device such as a capacitor. Thus, the voltage storage/discharge stage(s) 120 preferably includes capacitor(s) (not explicitly shown in FIG. 2), which alternately charge and discharge to store and transfer charge. In a preferred embodiment, the voltage storage/discharge stage 120 is the same as the conventional capacitor-diode ladder 12, depicted in FIG. 1. Because charge is stored and transferred, the voltage storage/discharge stage(s) 120 provide an output, preferably a power, that may be used to increase the voltage above that provided by the voltage supply 102.

The oscillator 110 is used to drive the voltage storage/discharge stage(s) 120. The oscillator 110 has a frequency that has an inverse relationship to the supply voltage. Stated differently, the frequency of the oscillator 110 increases as the supply voltage decreases. In a preferred embodiment, the frequency of the oscillator 110 is inversely proportional to the supply voltage.

Because the oscillator 110 is used to drive the voltage storage/discharge stage(s) 120, the rate at which the voltage storage/discharge stage(s) 120 charge and discharge is related to the frequency of the oscillator 110. The current output by the system 100, therefore, increases with increases in the frequency of the oscillator 110. Because the frequency increases as the supply voltage provided by the voltage supply 102 decreases, the current output by the system 100 increases as the supply voltage decreases. This increase may be sufficient to account for losses, including those due to leakage in PMOS and/or NMOS devices and lower voltages stored in the capacitance of the charge pump. As a result, the system 100 may be used with lower supply voltages to provide a voltage that is higher than the supply voltage while maintaining a sufficient output current. In a preferred embodiment, the system 100 provides a power that is sufficiently high for EEPROM or Flash programming in low voltage supply applications, such as smart card applications.

Figure 3:
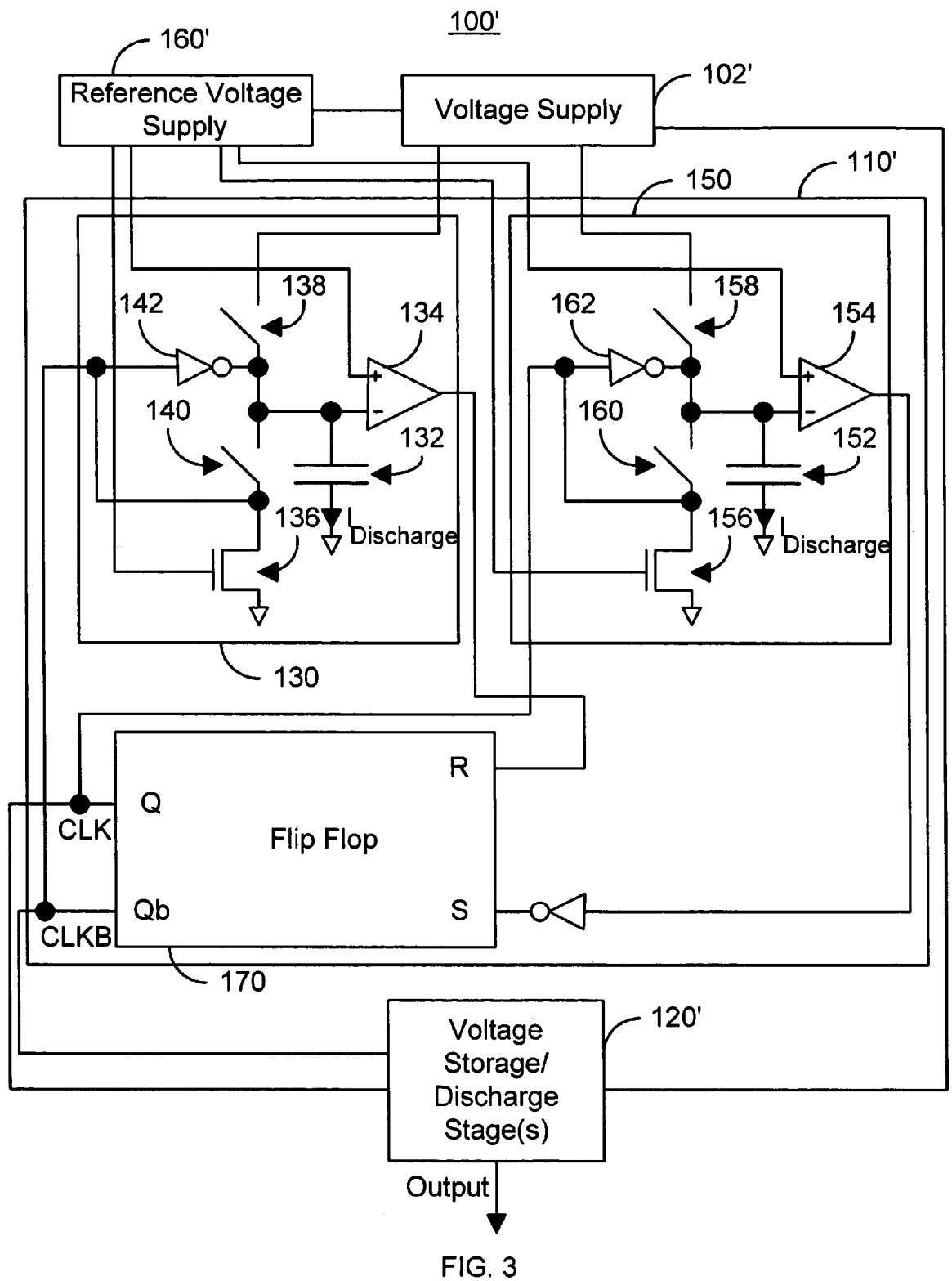
FIG. 3 is a diagram depicting one embodiment of a system in accordance with the present invention for providing a voltage higher than a supply voltage.

FIG. 3 is a diagram depicting a preferred embodiment of a system 100' in accordance with the present invention for providing a voltage higher than a supply voltage. The system 100' is a charge pump. The system 100' is analogous to the system 100 and includes analogous components. The system 100' thus uses a reference voltage source 160' and includes an oscillator 110' and a voltage storage/discharge stage 120', which is coupled with the voltage supply 102'.

The voltage supply 102' provides a supply voltage for the system 100' and, in a preferred embodiment, for the remainder of the semiconductor device in which the system 100' is used. In addition, the supply voltage is preferably a lower voltage. In a preferred embodiment, the supply voltage is sufficiently low for applications such as smart cards. Thus, in one embodiment, the supply voltage is nominally 1.6 volts, but may range between 1.2 volts and 02 volts. However, in other embodiments, other nominal voltages and/or voltage ranges may be possible. The reference voltage source 160' provides a reference voltage to the oscillator 110' as described below. In a preferred embodiment, the reference voltage source 160' is stable over supply.

The voltage storage/discharge stage 120' is used to store and transfer charge. Thus, a higher-than-supply voltage may be achieved using the voltage storage/discharge stage 120'. The voltage storage/discharge stage 120 is preferably a capacitor-diode ladder, such as the capacitor-diode ladder 12 depicted in FIG. 1. However, in another embodiment, another architecture may be used.

The oscillator 110' includes a first phase 130, a second phase 150, and a flip-flop 170. The first phase 130 includes a first capacitor 132, a first operational amplifier 134, a first transistor 136, a first switch 138, a second switch 140, and a first inverter 142. The first capacitor 132 is coupled with an input of the first operational amplifier 134 on a first side and to ground on the other side. The other, preferably noninverting input of the operational amplifier 134 is coupled with the reference voltage supply 160'. The first capacitor 134 is also coupled with switches 138 and 140. The switches 138 and 140 are coupled in parallel to the flip-flop 170 and receive the clock signal CLKB. However, the first switch 138 is coupled with the flip-flop 170 through the inverter 142.

The second phase 150 is analogous to the first phase 130. The second phase 150 includes a second capacitor 152, a second operational amplifier 154, a second transistor 156, a third switch 158, a fourth switch 160, and a second inverter 162. The components 152, 154, 156, 158, 160, and 162 of the second phase 150 are coupled in an analogous manner to the components 132, 134, 136, 138, 140, and 142, respectively, of the first phase 130. However, instead of receiving the clock signal CLKB from the flip-flop 170, the clock signal CLK is received from the flip-flop 170. In addition, the clock signal CLK and CLKB is provided from the flip-flop 170 to the voltage storage/discharge stage(s) 120'.

The oscillator 110' is used to drive the voltage storage/discharge stage(s) 120'. The oscillator 110' has a frequency that increases as the supply voltage decreases. In particular, the frequency of the oscillator 110' is inversely proportional to the supply voltage provided by the voltage supply 102'. This property of the oscillator 110' can be seen as follows. The reference voltage source 160' providing the reference voltage, $V_{ref}$, is coupled with a terminal of the operational amplifiers 134 and 154. Consequently, the discharge voltage, $V_{Discharge}$, for each or the capacitors 132 and 152 is substantially $V_{DD} - V_{ref}$. Moreover, the periods of the first and second phases 130 and 150, $T_1$ and $T_2$, can be determined from the discharge voltage, the capacitances of the capacitors 132 and 152, and the discharge current $I_{Discharge}$. Thus, the period of the first phase 130 is given by: $T_1 = C_{cap132} * V_{Discharge} / I_{DischaragePhase1}$. Similarly, the period of the second phase 150 is given by: $T_2 = C_{cap152} * V_{Discharge} / I_{DischargePhase2}$. In a preferred embodiment, the first phase 130 and the second phase 150 are identical. Consequently, the capacitors 132 and 152 both have the same capacitance, C. In addition, the discharge currents, $I_{Discharge}$, are preferably the same. Thus, $T_1 = T_2 = C * V_{Discharge} / I_{Discharge}$. Because the capacitors 132 and 152 alternately charge and discharge, the period of the oscillator 110, T, is the sum of $T_1$ and $T_2$. Thus, $T = 2 * C * V_{Discharge} / I_{Discharge}$. The frequency of the oscillator 110 is thus set to be proportional to $I_{Discharge} / [2 * C * V_{Discharge}]$. As discussed above, the discharge voltage is $V_{DD} - V_{ref}$. Consequently, the frequency of the oscillator 110' is inversely proportional to the supply voltage.

Figure 4:
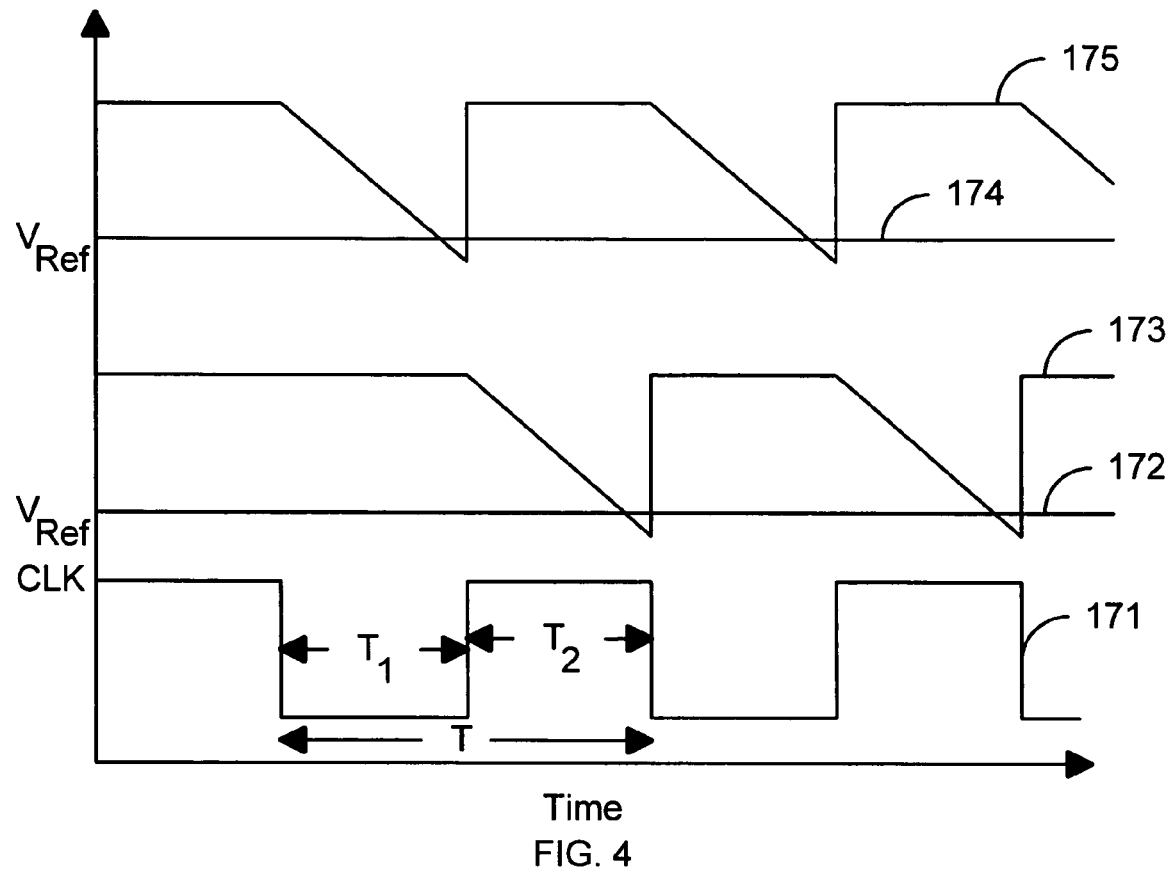
FIG. 4 is a diagram depicting signals for in one embodiment of a system in accordance with the present invention.

FIG. 4 is a diagram depicting signals 171, 172, 173, 174, and 175 for in one embodiment of a system 100' in accordance with the present invention. Consequently, operation of the system 100' is described in the context of the signals 171, 172, 173, 174, and 175 in FIG. 4. Referring to FIGS. 3 and 4, the signals 171 corresponds to the clock signal from the oscillator 110'. Thus, the clock signal 171 has a characteristic frequency that is inversely proportional to the supply voltage $V_{DD}$. The period, T, of the clock signal 171 is thus proportional to the supply voltage. The signals 172 and 174 are reference voltage signals, $V_{ref}$ for the second phase 150 and the first phase 130, respectively. As can be seen in FIG. 4, the signals 172 and 174 indicate that the reference voltage is stable. The voltages on the capacitors 132 and 152 are depicted by signals 175 and 173, respectively.

In operation, the capacitors 132 and 152 are pre-charged to the supply voltage, $V_{DD}$. Thus, the signals 173 and 175 commence at $V_{DD}$. As indicated by the signal 175, the capacitor 132 discharges and rapidly recharges during the first portion of the period, $T_1$. When the voltage of the capacitor 132 drops below the reference voltage, the output of the operational amplifier 134 changes state, causing the flip-flop 170 to toggle. The capacitor 152 discharges and rapidly recharges during the second portion of the period, $T_2$, as indicated by the signal 173. When the voltage of the capacitor 152 drops below the reference voltage, the output of the operational amplifier 154 changes state, causing the flip-flop 170 to toggle. Note that the signals 173 and 175 indicate that the charge on the capacitors decreases such that the lowest voltage of the capacitors 132 and 152 is slightly less than $V_{ref}$. Thus, the first phase 130 and the second phase 150 alternately charge and discharge. As a result, the clock signal CLK is maintained by the oscillator 110'. This signal is used to drive the voltage storage/discharge stage(s) 120', which may include capacitors (not shown in FIG. 3) that alternate charge and discharge. Consequently, charge and voltage are output by the voltage storage/discharge stage 120'. Thus, a higher-than supply voltage and a sufficient output current may be obtained.

Figure 5:
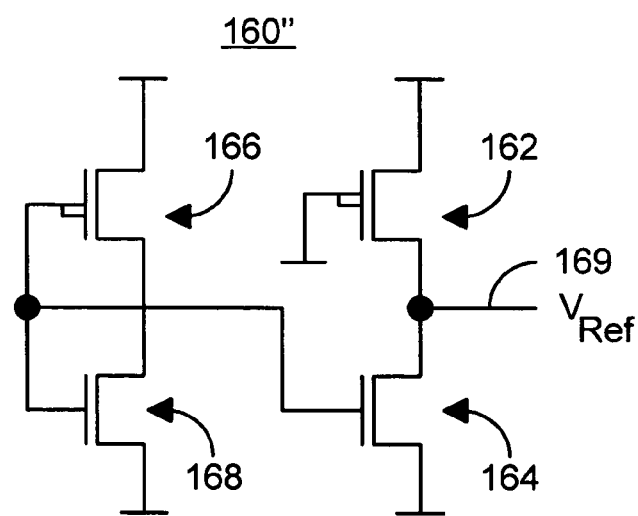
FIG. 5 is a diagram depicting one embodiment of a system in accordance with the present invention for providing a reference voltage.

FIG. 5 depicts one embodiment of a reference voltage source 160" in accordance with the present invention which may be stable over the supply. The reference voltage source 160" is stable across the supply voltage, has low power consumption, fast startup, and a simple architecture. Although the reference voltage source 160" varies with temperature, the reference voltage source 160" may be used in many applications. However, another reference voltage source (not shown) could be used. For example, a band gap reference voltage source (not shown) might be used. A band gap reference voltage source may be stable across the supply voltage, have a low temperature variation, but a slow startup. In applications needing a fast startup, such a band gap reference voltage source may be used if it is already on, thereby obviating issues due to a slow startup. The reference voltage source 160" includes transistors 162, 164, 166, and 168. The transistors 162 and 166 are p-type devices, while the devices 164 and 168 are n-type devices. The output 169 of the reference voltage source 160" is coupled between the devices 162 and 164. In a preferred embodiment, the reference voltage, $V_{Ref}$, is given by: $V_{Ref} = V_{DD} - I_{162} * R_{162}$. $I_{162}$ is the current through the device 162. $R_{162}$ is the resistance of the device 162. The reference voltage can also be expressed as $V_{Ref} = V_{DD} - [K_n * W_n / L_n (V_{GSp} - V_{Th})^2] / [K_p * W_p / L_p (V_{GSn} - V_{Th})]$, where K is the transconductance of the device, n and p refer to the conductivity type of the device 162 and 164, $V_T$ is the threshold voltage of the device 162 and 164 and $V_{GS}$ is the gate voltage of the device 162 and 164. Furthermore, the expression for the reference voltage may be further simplified to $V_{Ref} = V_{DD} - \beta * [(V_{GSn} - V_{Th})^2 / (V_{GSp} - V_{Th})]$. In addition, as stated above, it is preferred for the reference voltage to be stable over the supply. Thus, $V_{Ref}$ at a supply voltage of 1.6 volts is desired to be the same as $V_{Ref}$ at s supply voltage of 1.2 volts. As a result, the device 164 is operated in saturation mode and an inverter formed of devices 166 and 168 is used. If the above is true and the relationships $V_{GSn} = V_{DD}/2$ and $V_{SGp} = V_{DD}$ are true, then the reference voltage is stable over supply for the reference voltage source 160". Thus, a reference voltage source 160" that is stable over supply may be provided.

Because the oscillator 110' is used to drive the voltage storage/discharge stage 120', the rate at which the capacitors 132 and 152 in the voltage storage/discharge stage 120' charge and discharge is related to the frequency of the oscillator 110'. The current output by the system 100' thus increases with increases in the frequency of the oscillator 110'. Because the frequency increases as the supply voltage provided by the voltage supply 102' decreases, the current output by the system 100' increases as the supply voltage decreases. This increase may be sufficient to account for other losses such as losses due to leakage in devices 136 and 156. As a result, the system 100' may be used with lower supply voltages and/or higher density devices to provide a voltage that is higher than the supply voltage while maintaining a sufficient output current. In a preferred embodiment, the system 100' provides a voltage that is sufficiently high for EEPROM programming in for a low voltage supply applications, such as smart card applications. In addition, the system 100' may also have a relatively fast startup time. Consequently, startup performance of a device incorporating the system 100' may be improved. Furthermore, the system 100' utilizes a relatively small number of devices, thereby allowing the system 100' to be relatively easily adjusted. The system 100' may also utilize only standard CMOS components. The system 100' is thus more easily fabricated and shrunk as semiconductor technology moves to smaller sizes.

Figure 6:
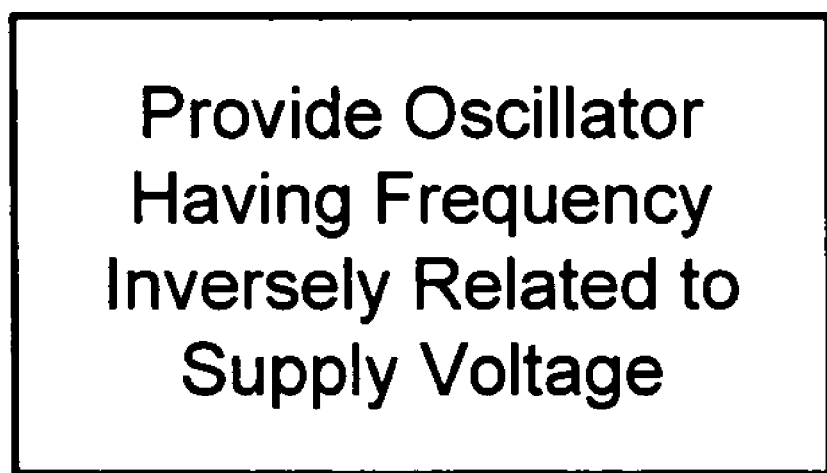
FIG. 6 is a flow chart depicting another embodiment of a method in accordance with the present invention for providing a system for providing a voltage higher than a supply voltage
Figure 6:
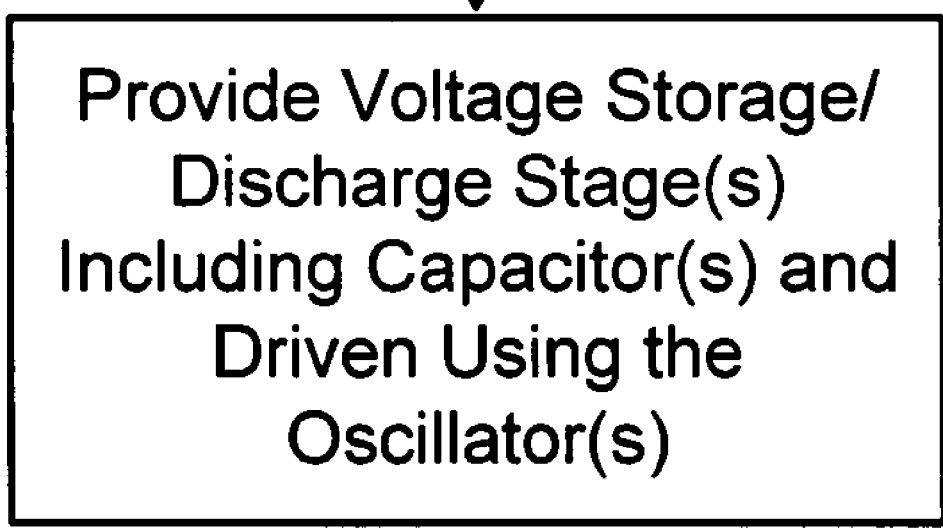

FIG. 6 is a flow chart depicting another embodiment of a method 200 in accordance with the present invention for providing a system for providing a voltage higher than a supply voltage. At least one oscillator 110/110' having a frequency that increases as the supply voltage decreases is provided, via step 202. In a preferred embodiment, the frequency is inversely proportional to the supply voltage. At least one voltage storage/discharge stage 120/120' is also provided, via step 204. The voltage storage/discharge stage 120/120' is coupled with the oscillator(s) 110/110'. Thus, using the method 200, the system 100/100' may be provided. Consequently, a system 100/100' for generating a power that is sufficiently high for EEPROM programming in for a low voltage supply applications, such as smart card applications, may be provided.

A method and system for providing an output voltage greater than a supply voltage provided by a voltage supply while maintaining a sufficient output current in semiconductor devices, such as EEPROMs and Flash devices. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A system for providing an output voltage greater than a voltage provided by a voltage supply in a semiconductor device, the system comprising:
at least one oscillator having a frequency that increases as the voltage decreases, wherein the at least one oscillator includes a first phase and a second phase, the first phase including at least a first capacitor, the second phase including at least a second capacitor, the first capacitor and second capacitor charging and discharging determining the frequency, wherein the first phase also includes a first switch, a second switch, an inverter, an operational amplifier having an output and two inputs, and a transistor, wherein the first capacitor has a first side and a second side, the first side coupled with the voltage though the first switch and to the transistor through the second switch, the first side also coupled with one of the two inputs of the operational amplifier, another of the two inputs of the operational amplifier being coupled with a reference voltage, the second side of the first capacitor being coupled with ground, the output of the operational amplifier being coupled with a flip-flop; and
at least one voltage storage/discharge stage coupled with the at least one oscillator, the frequency determining a discharge frequency for the at least one voltage storage/discharge stage.

2. The system of claim 1 wherein the frequency is inversely proportional to the voltage.

3. The system of claim 1 wherein the at least one oscillator utilizes a reference voltage, the reference voltage being stable over the voltage.

4. The system of claim 3 wherein the system further includes a reference voltage supply for providing the reference voltage, the reference voltage supply further including:
an inverter;
an n-type transistor having a gate coupled with the inverter, a source, and a drain; and
a p-type transistor coupled with the source of the n-type transistor.

5. The system of claim 1 wherein the first phase further includes an inverter, the first switch being coupled with the inverter, the inverter and the second switch being coupled with the flip flop.

6. The system of claim 5 wherein the second phase includes a third switch, a fourth switch, an additional inverter, an additional operational amplifier having an additional output and two additional inputs, and an additional transistor, wherein the second capacitor has a first side and a second side, the first side of the second capacitor being coupled with the voltage though the third switch and to the additional transistor through the fourth switch, the first side of the second capacitor also coupled with one of the two additional inputs of the additional operational amplifier, another of the two inputs of the additional operational amplifier being coupled with the reference voltage, the second side of the second capacitor being coupled with the ground, the additional output of the additional operational amplifier being coupled with the flip flop.

7. The system of claim 6 wherein the second phase further includes an additional inverter, the third switch being coupled with the additional inverter, the additional inverter and the fourth switch being coupled with the flip-flop.

8. A system for providing an output voltage greater than a voltage provided by a voltage supply in a semiconductor device, the system comprising:
at least one voltage storage/discharge stage;
at least one oscillator having a frequency that increases as the voltage decreases and being coupled with the at least one voltage storage/discharge stage, the frequency determining a discharge frequency for the at least one voltage storage/discharge stage, the at least one oscillator including a first phase and a second phase, the first phase including at least a first capacitor, a first switch, a second switch, a first inverter, a first operational amplifier, and a first transistor, wherein the first capacitor has a first side and a second side, the first side coupled with the voltage though the first switch and to the transistor through the second switch, the first side also coupled with the first operational amplifier, the second side being coupled with ground, the second phase including at least a second capacitor, a third switch, a fourth switch, a second inverter, a second operational amplifier, and a second transistor, wherein the second capacitor has a first side and a second side, the first side of the second capacitor coupled with the voltage though the first switch and to the transistor through the second switch, the first side of the second capacitor also coupled with the second operational amplifier, the second side of the second capacitor being coupled with the ground; and
at least one reference voltage supply coupled with first operational amplifier and the second operational amplifier, the at least one reference voltage supply including an inverter, a nmos transistor, and a pmos transistor, the nmos transistor having a source, a drain, and a gate coupled with the inverter, the pmos transistor coupled with the source of the nmos transistor.

9. A method for providing an output voltage greater than a voltage provided by a voltage supply in a semiconductor device, the method comprising:
providing at least one oscillator having a frequency that increases as the voltage decreases, wherein the at least one oscillator includes a first phase and a second phase, the first phase including at least a first capacitor, the second phase including at least a second capacitor, the first capacitor and the second capacitor charging and discharging determining the frequency, wherein the first phase also includes a first switch, a second switch, an inverter, an operational amplifier having an output and two inputs, and a transistor, wherein the first capacitor has a first side and a second side, the first side coupled with the voltage though the first switch and to the transistor through the second switch, the first side also coupled with one of the two inputs of the operational amplifier, another of the two inputs of the operational amplifier being coupled with the reference voltage, the second side of the first capacitor being coupled with ground, the output of the operational amplifier being coupled with a flip flop; and providing at least one voltage storage/discharge stage coupled with the at least one oscillator, the frequency determining a discharge frequency for the at least one voltage storage/discharge stage.

10. The method of claim 9 wherein the frequency is inversely proportional to the voltage.

11. The method of claim 9 wherein the at least one oscillator utilizes a reference voltage, the reference voltage being stable over the voltage.

12. The method of claim 11 wherein method further includes:

providing a reference voltage supply for generating the reference voltage, the reference voltage supply further including an inverter, a n-type transistor, and a p-type transistor, the n-type transistor having a gate coupled with the inverter, a source, and a drain, the p-type device being coupled with the source of the n-type transistor.

13. The method of claim 9 wherein the first phase further includes an inverter, the first switch being coupled with the inverter, the inverter and the second switch being coupled with the flip flop.

14. A method for providing an output voltage greater than a voltage provided by a voltage supply in a semiconductor device, the method comprising:

generating a clock signal having a frequency that increases as the voltage decreases using at least one oscillator, the at least one oscillator including a first phase and a second phase, the first phase including at least a first capacitor, a first switch, a second switch, a first inverter, a first operational amplifier, and a first transistor, wherein the first capacitor has a first side and a second side, the first side coupled with the voltage though the first switch and to the transistor through the second switch, the first side also coupled with the first operational amplifier, the second side being coupled with ground, the second phase including at least a second capacitor, a third switch, a fourth switch, a second inverter, a second operational amplifier, and a second transistor, wherein the second capacitor has a first side and a second side, the first side of the second capacitor coupled with the voltage though the first switch and to the transistor through the second switch, the first side of the second capacitor also coupled with the second operational amplifier, the second side of the second capacitor being coupled with the ground; and utilizing the clock signal to drive at least one voltage storage/discharge stage, the frequency determining a discharge frequency of the at least one voltage storage/discharge stage.

15. The system of claim 1, wherein the system is included in a charge pump.

16. The system of claim 1, wherein the semiconductor device includes at least one of an EEPROM and a Flash device.

* * * * *

UNITED STATES PATENT AND TRADEMARK OFFICE
CERTIFICATE OF CORRECTION

PATENT NO. : 7,688,001 B2  Page 1 of 1
APPLICATION NO. : 11/440501
DATED : March 30, 2010
INVENTOR(S) : Jerome Pratlong et al.

It is certified that error appears in the above-identified patent and that said Letters Patent is hereby corrected as shown below:

In column 2, line 56, after "voltage" insert -- . --.

In column 5, line 13, delete "$I_{DischaragePhase1}$." and insert -- $I_{DischargePhase1}$. --, therefor.

In column 7, line 37, in Claim 1, delete "though" and insert -- through --, therefor.

In column 8, line 4, in Claim 6, delete "though" and insert -- through --, therefor.

In column 8, line 31, in Claim 8, delete "though" and insert -- through --, therefor.

In column 8, line 39, in Claim 8, delete "though" and insert -- through --, therefor.

In column 8, line 65, in Claim 9, delete "though" and insert -- through --, therefor.

In column 10, line 6, in Claim 14, delete "though" and insert -- through --, therefor.

In column 10, line 15, in Claim 14, delete "though" and insert -- through --, therefor.

Signed and Sealed this

Eighteenth Day of May, 2010

David J. Kappos
*Director of the United States Patent and Trademark Office*